J. Q. A. FRAZIER.
Harvester.
No. 32,828.
Patented July 16, 1861.
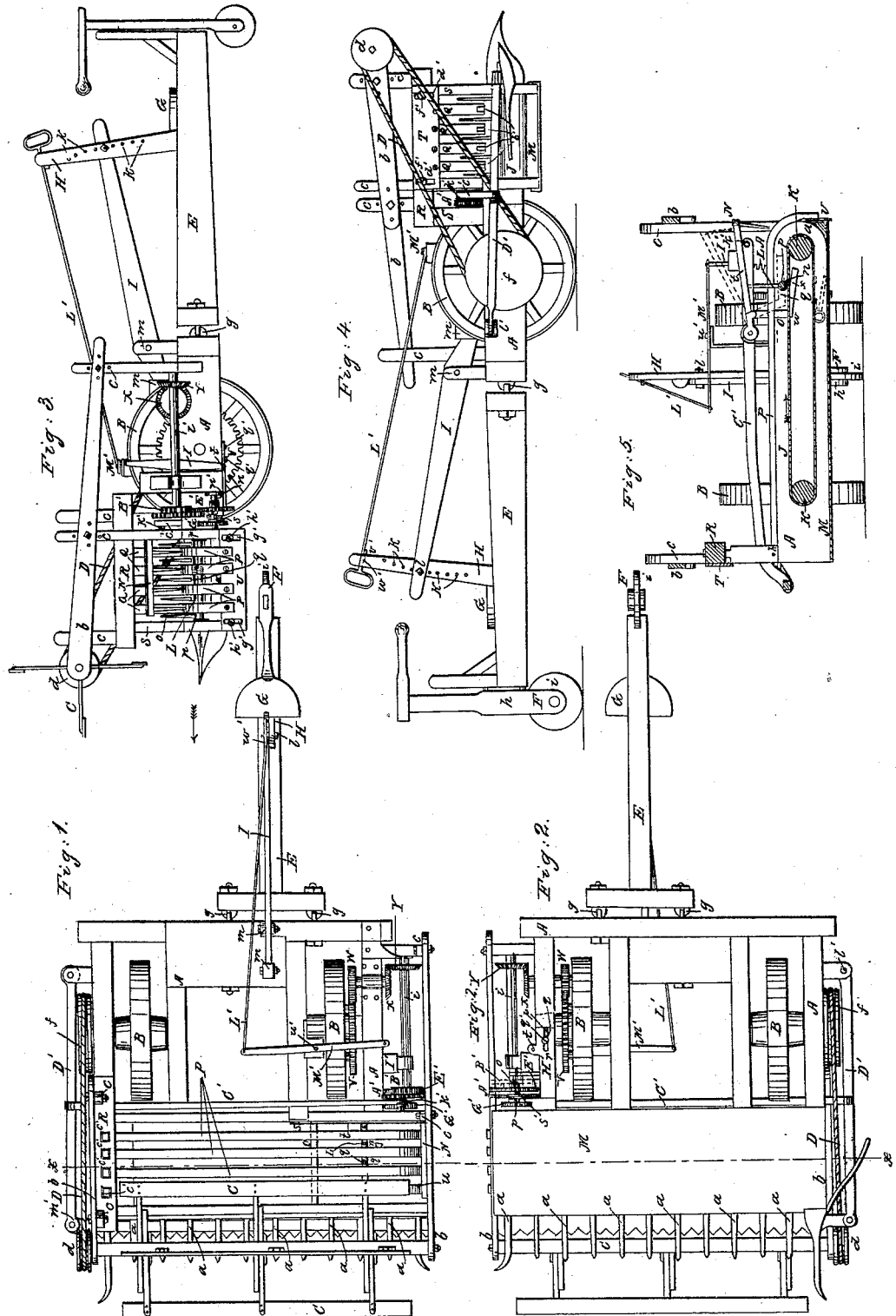

UNITED STATES PATENT OFFICE.

JOHN Q. A. FRAZIER, OF PIQUA, OHIO.

IMPROVEMENT IN HARVESTERS.

Specification forming part of Letters Patent No. 32,828, dated July 16, 1861.

*To all whom it may concern:*

Be it known that I, JOHN Q. A. FRAZIER, of Piqua, in the county of Miami and State of Ohio, have invented certain new and useful Improvements in Harvesters; and I do hereby declare that the following is a full and exact description thereof, reference being had to the accompanying drawings, making part of this specification—

Figure 1 being a plan of the top of the machine; Fig. 2, a plan of the bottom thereof; Fig. 3, a side elevation thereof, looking on the left; Fig. 4, a similar elevation, looking on the right; Fig. 5, a transverse vertical section in the plane indicated by the line $x\ x$, Figs. 1 and 2.

Like letters designate corresponding parts in all the figures.

The operating parts of the machine are mounted in a suitable frame, A, of any ordinary or convenient construction, supported by driving-wheels B B, turning on a common axis. The machine is propelled from behind, in the direction shown by the arrows in front of the fingers, and therefore the ordinary fingers, $a\ a\ a$, in which the sickle operates, are situated in the position indicated. Above the fingers is situated the usual reel, C, the shaft of which turns in bearings $b\ b$, supported by suitable standards, $c\ c\ c\ c$, on each side of the machine. The reel is driven in any desirable manner, that represented in the drawings being by a band, D, passing around a pulley, $d$, on one end of the reel-shaft, and a pulley, $f$, on the revolving shaft of one of the driving-wheels.

To the rear of the frame A is jointed, in any desirable manner, as at $g\ g$, the cross-head of a propelling-shaft, E, of suitable length for the purpose designed, and having at its hind end a rudder, F, hinged thereto, so as to turn horizontally, substantially as represented. This rudder consists of a shank, $h$, having in its lower end, resting on the ground, a wheel, $i$, and at its upper end a handle by which it is operated. By means of this rudder the machine is guided in its passage over the ground by the operator, who stands on the platform G. The propelling-shaft has an upright standard, H, provided with a set of adjusting-holes, $k\ k\ k$, concentric with the axis of the driving-wheels, into any one of which fits a bolt, $l$, securing to the standard the end of a lever, I, which extends forward, and is fastened rigidly to the frame of the machine, as at $m\ m$. By adjusting this lever higher or lower on the standard H, by means of the bolt $l$ and adjusting-holes, the forward end of the machine is correspondingly raised or lowered, so as to adapt it to any work desired.

The parts above described are common in machines of this class, and need no further especial description. My improvements relate more particularly to the arrangement of the parts forming the raking and gavel-forming device, the perfect adjustability of the platform to any work required, and the manner of regulating the rake for use in light or heavy grain.

Inclosed in the frame A, immediately in the rear of the fingers $a\ a\ a$, is situated an endless apron, J, of suitable length and width for the purpose designed, and turning on rollers K K', as represented most clearly in Fig. 5. Transversely on this apron is situated the rake L, consisting of a head, $n$, in which fits a suitable number of teeth, $o\ o\ o$, extending upward between the slats of the grain-platform. The head $n'$ forms a turning-shaft, whose projections rest in bearings $p\ p$, respectively, at each end thereof. In order to hold the rake in an upright position when acting on the grain, and at the same time allow it to yield backward, as hereinafter to be described, when not acting on the grain, I employ a coiled spring, $q$, or its equivalent, of suitable stiffness, around the shaft, one end being secured thereto, and the other end passing from under the shaft backward, and being secured to the belt or apron, as clearly represented in the drawings. Thus arranged, the spring has a tendency to throw the rake forward in the direction of the motion of the endless apron, and its elasticity also allows the rake to be thrown backward in the opposite direction when the proper means are applied to produce that result. To prevent the rake being thrown forward by the spring beyond the desired upright position, the shaft $n$ may be provided with a stop, $r$, which strikes against the body of the bearings $p\ p$, or any other convenient arrangement may be used.

Under the endless apron J, and as near thereto as will allow the rake to pass in a trailing or horizontal position between, is situated a shield, M, usually of thin metal, of a length and width equaling or more than that of the endless apron, substantially as represented in Figs. 2 and 5. This shield not only protects the apron from injury in coming in contact with objects to which it is exposed, but also serves as the guide by which the rake is turned and held in its trailing position when passing back to the other side of the machine after forming and discharging a gavel.

At a suitable position on the rear side of the endless apron, as at $s$, Figs. 1 and 5, is jointed so as to turn vertically the shank $t$ of a head, N, similar to a rake-head, having teeth $u$ $u$ $u$, resting on the discharge end of the platform-slats. This head I term the "gavel-rake," as its office is to stop and collect the grain in a gavel as it is raked forward by the platform-rake L. From the shank $t$, just forward of its joint, an arm, $v$, extends downward a little below the top of and behind the endless apron, as represented at $w$, Fig. 5, and from this point it turns outward, forming a projection, $z$, of suitable length for the purpose designed, and making an obtuse angle with the arm. The gavel-rake is operated by a transverse ledge or bar, O, of suitable size, secured at the proper distance in the rear of the platform-rake L to the endless apron, and projecting beyond the edge of said apron, so as to strike against the arm $v$.

The operation of these parts thus combined is as follows: When the endless apron is started with the platform-rake L in an upright position at the right-hand end of the platform, the said rake, in its passage, carries the grain before it and collects it against the gavel-rake N, (which is then resting on the platform,) consequently forming a bunch or gavel. As soon as the two rakes are sufficiently near together to properly compress the grain, (in the position shown in the drawings,) the ledge O on the endless apron strikes against the arm $v$, thereby throwing it forward and raising the gavel-rake sufficiently to allow the gavel to pass from under it and be discharged, as represented by red lines. The point $w$ of the arm $v$, being situated a little lower than the ledge O, causes the gavel-rake to be raised quickly, and as soon as it is raised it is sustained in that position by means of the ledge O holding under the projection $z$, till the platform-rake has discharged the gavel, when it is released, and said gavel-rake falls into its former position again, ready for forming another gavel. As soon as the platform-rake has reached the discharge end of the platform the teeth $o$ $o$ $o$ strike against the point $a'$ of the main frame above the shield, when the coiled spring $q$ yields to the resistance and allows the rake to be turned into the trailing or horizontal position represented in red lines in Fig. 5, and it is held in this position during its entire backward passage by resting on the shield M. Thus the shield not only answers for the purpose of protecting the endless apron, but also serves to turn and hold the rake in its horizontal position in the passage backward. This manner of turning and guiding the rake-head by the shield alone is superior to any arrangement with which I am acquainted, as in other devices of the kind special guides or ledges have to be provided for the purpose, thereby rendering the device costly, complicated, and liable to get out of order. The action of the gavel-rake, in connection with the ledge or bar O, is also simple and effective and not easily deranged, and the cost is very small.

In order to make the grain-platform adapted to all kinds of work and to every condition of the machine, I render it perfectly adjustable, as follows: The platform is composed of a suitable number of slats P P P, extending in length the whole width of the machine, and the ends of these slats at the right-hand end of the machine are suitably joined, as represented at $b'$ $b'$ $b'$, Fig. 4, to the lower ends of adjusting-standards Q Q Q, extending upward, their upper ends sliding in corresponding mortises, $c'$ $c'$ $c'$, made in a beam, R, suitably sustained above the main frame by supports S S. These adjusting-standards are respectively secured to an adjustable plate, T, having at each end thereof an oblong vertical slot, $d'$, through which passes a tightening-screw, $f'$, into the beam R. The opposite ends of the slats P P P, at the left-hand side of the machine, are curved over and downward, as represented most clearly in Figs. 1, 3, and 5, and are respectively secured to an adjustable plate, U, similar to the plate T at the opposite side of the machine, having oblong slots $g'$ $g'$, respectively, at each end thereof, through which pass tightening-screws $h'$ $h'$. Arranged thus, the platform is adjusted upward or downward, retaining its level by sliding the adjusting-plates T and U upward or downward an equal distance, and then tightening the set-screws $f'$ $f'$ and $h'$ $h'$ in their respective slots; or either end of the platform may be raised angular with the horizon, as is frequently desirable in going over slightly-inclined ground, by adjusting the plate T or U on only one side of the machine.

The sickle and the endless apron are actuated by a suitable arrangement of gearing from one of the main driving-wheels B B as follows: To the shaft of the driving-wheel is rigidly secured a main spur-cog wheel, V, gearing into a spur-pinion, W, on the opposite end of whose shaft is a bevel-pinion, X, meshing with a corresponding bevel-pinion, Y, situated on a shaft, $i'$, parallel with the motion of the machine. To the opposite end of this shaft are secured two spur-pinions, A' and B', of different diameters, as represented, on the face of the front one of which is a crank, $k'$, having secured to it one end of a connecting rod or bar, C', extending transversely across the machine, the opposite end thereof being secured to a rock-lever, D'. This rock-lever turns at one extremity on a stationary pivot, $l'$, which acts as its fulcrum, while its other extremity is jointed at $m'$ to the sickle-bar. Thus, as the pinion A' is revolved, the sickle is actuated through the connecting-bar and rock-lever.

The shaft $n'$ of the roller K, around which the left end of the endless apron passes, extends backward a suitable distance and rests in a proper bearing in the main frame of the machine. A portion, $o'$, of this shaft, of suitable length, under the pinions A' and B', above described, is made square in transverse section, as represented most clearly in Figs. 2 and 3, and on this square portion of the shaft rests and slides the hub $p'$ of two spur-pinions, E' and G'. The diameters of these pinions are made to correspond relatively with the pinions A' and B' above them; but their position is reversed, the large pinion E' being intended to gear with the small pinion B', and the small pinion G' with the large pinion A'. These two pinions E' and G' are situated at such a distance apart that when one is in gear with its engaging-pinion above the other will be out of gear with its engaging-pinion, and vice versa.

On the bottom of the side piece of the main frame next the gearing is situated a sliding plate, H', held in place by and sliding over guide-bearings $q'$ $q'$, passing through oblong slots $r'$ $r'$ of said plate, substantially as represented in Figs. 2 and 3. The forward end of this plate has a projecting arm, $s'$, its extremity forming a clutch, embracing in a suitable manner the hub $p'$ of the pinions E' and G'. At a suitable point to the plate H', as at $t'$, is jointed, as represented, the lower end of a vertical vibrating lever, I', pivoted in its center, its upper end being likewise similarly jointed to one end of a horizontal rock-bar, M', turning on a center, $u'$. To the opposite end of this rock-bar is secured a stiff rod, L', extending backward to the operator's stand, the rear end thereof having suitable adjustable hooks or catches, $v'$ $v'$, for securing to a pin or projection, $w'$, on the standard H, substantially as represented. By means of this arrangement the operator, in pushing forward or drawing back the rod L', and consequently actuating the sliding plate H' through the rock-bar M' and vibrating lever I', can slide the two pinions E' and G' either forward or backward on the shaft $n'$ of the roller K, as may be desired. Thus either engaging pair, B' and E' or A' and G', of the pinions may be made to gear, thereby giving a greater or less velocity to the platform-rake. This varying of the velocity of the rake is necessary to adapt the machine to both heavy and light grain, a greater velocity being necessary in light grain and a less one in heavy grain to form gavels of uniform size. This arrangement is superior to others with which I am acquainted, since the velocity of the rake can be changed instantly by the operator without changing his place, without stopping the rake or the machine, and without stopping any of the gearing.

What I claim as my invention, and desire to secure by Letters Patent, is—

1. The arrangement and combination of the shield M, endless apron J, platform-rake L, ledge O, and gavel-rake N, provided with the arm $v$ and projection $z$, substantially as and for the purposes herein specified.

2. The platform composed of slats P P P, connected with the adjusting-plates T and U, whereby said platform is capable of being adjusted up and down in a horizontal position, or angularly, as may be desired, substantially as herein described.

In witness whereof I hereunto set my hand this 30th day of April, 1861.

JOHN Q. A. FRAZIER.

Witnesses:
W. N. FOSTER,
S. S. McKINNEY.